United States Patent
Park

(10) Patent No.: US 10,563,707 B2
(45) Date of Patent: Feb. 18, 2020

(54) POWER TRANSMISSION DEVICE PROVIDED WITH MORE THAN TWO PISTONS

(71) Applicant: C-STONE TECHNOLOGIES CO., LTD., Suwon-si (KR)

(72) Inventor: Dong-Hoon Park, Seongnam-si (KR)

(73) Assignee: C-STONE TECHNOLOGIES CO., LTD., Suwon-si (KR)

( * ) Notice: Subject to any disclaimer, the term of this patent is extended or adjusted under 35 U.S.C. 154(b) by 131 days.

(21) Appl. No.: 15/745,710

(22) PCT Filed: Aug. 10, 2016

(86) PCT No.: PCT/KR2016/008799
§ 371 (c)(1),
(2) Date: Jan. 17, 2018

(87) PCT Pub. No.: WO2017/026797
PCT Pub. Date: Feb. 16, 2017

(65) Prior Publication Data
US 2018/0202501 A1 Jul. 19, 2018

(30) Foreign Application Priority Data

Aug. 12, 2015 (KR) .................. 10-2015-0113997

(51) Int. Cl.
*F16D 25/0638* (2006.01)
*F16D 25/08* (2006.01)
(Continued)

(52) U.S. Cl.
CPC ............ *F16D 25/082* (2013.01); *B60K 17/02* (2013.01); *F16D 13/52* (2013.01); *F16D 13/56* (2013.01);
(Continued)

(58) Field of Classification Search
CPC ...... F16D 25/0638; F16D 25/12; F16D 13/52; F16D 2048/0212
See application file for complete search history.

(56) References Cited

U.S. PATENT DOCUMENTS 5,511,644 A * 4/1996 Murata ................... F16D 13/52
192/109 F
5,701,976 A * 12/1997 Kumagai ............... F16D 55/40
188/71.5
(Continued)

FOREIGN PATENT DOCUMENTS

EP 1895182 3/2008
JP 2007-218308 8/2007
(Continued)

OTHER PUBLICATIONS

EPO, The extended European Search Report of EP 16835437.1 dated Feb. 1, 2019.
(Continued)

*Primary Examiner* — David R Morris
(74) *Attorney, Agent, or Firm* — Lex IP Meister, PLLC

(57) ABSTRACT

A power transmission device including two or more pistons is disclosed The power transmission device includes: a housing arranged to form a mounting space by connecting a clutch housing, a clutch connecting portion, a clutch hub and a disk housing to each other; a power transmission hub selectively and operably connected to the housing; first friction disks splined to an interior circumference of the disk housing; second friction disks splined to an exterior circumference of the power transmission hub and disposed alternately with the first friction disks; a piston module including two or more pistons respectively having a corresponding piston chamber, and selectively and frictionally coupling the first friction disks with the second friction disks; and at least one return spring or at least one separating spring supplying a spring load counteracting against an axial force, wherein friction material is attached to any surface of first or second friction disks.

19 Claims, 11 Drawing Sheets

(51) Int. Cl.
*B60K 17/02* (2006.01)
*F16D 13/56* (2006.01)
*F16D 13/52* (2006.01)
*F16D 13/68* (2006.01)

(52) U.S. Cl.
CPC ....... *F16D 13/683* (2013.01); *F16D 25/0638* (2013.01)

(56) References Cited

U.S. PATENT DOCUMENTS

| | | | | |
|---|---|---|---|---|
| 5,950,787 | A * | 9/1999 | Murasugi | F16D 25/06 192/85.25 |
| 7,140,481 | B2 * | 11/2006 | Hagenow | F16D 25/0638 192/85.42 |
| 8,074,778 | B2 * | 12/2011 | Jayaram | F16D 25/0638 192/114 R |
| 9,458,896 | B2 * | 10/2016 | Park | F16D 25/0638 |
| 2005/0284724 | A1 | 12/2005 | Hagenow | |
| 2008/0314711 | A1 * | 12/2008 | Jayaram | F16D 25/0638 192/85.34 |
| 2015/0247537 | A1 * | 9/2015 | Park | F16D 25/12 192/85.25 |
| 2019/0178305 | A1 * | 6/2019 | Chae | F16D 25/0638 |
| 2019/0186559 | A1 * | 6/2019 | Shin | F16D 48/02 |

FOREIGN PATENT DOCUMENTS

| | | |
|---|---|---|
| JP | 2015-039265 | 2/2015 |
| JP | 5736405 | 6/2015 |
| KR | 10-2011-0029221 | 3/2011 |
| KR | 10-2015-0003976 | 1/2015 |

OTHER PUBLICATIONS

WIPO, PCT Search Report of PCT/KR2016/008799 dated Nov. 17, 2016.

* cited by examiner

[FIG. 1]
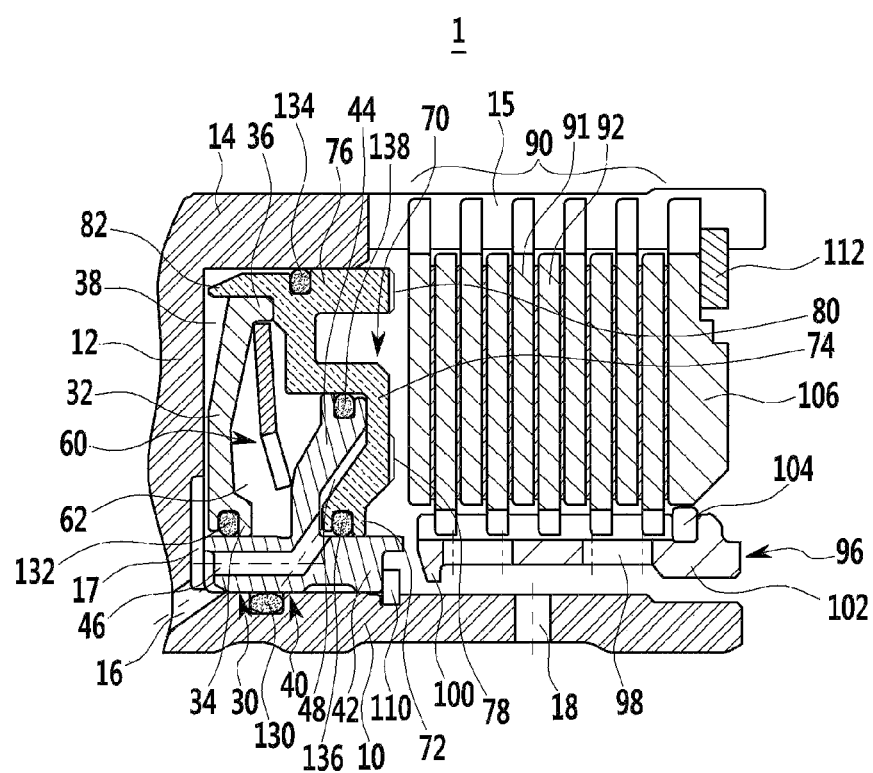

[FIG. 2]
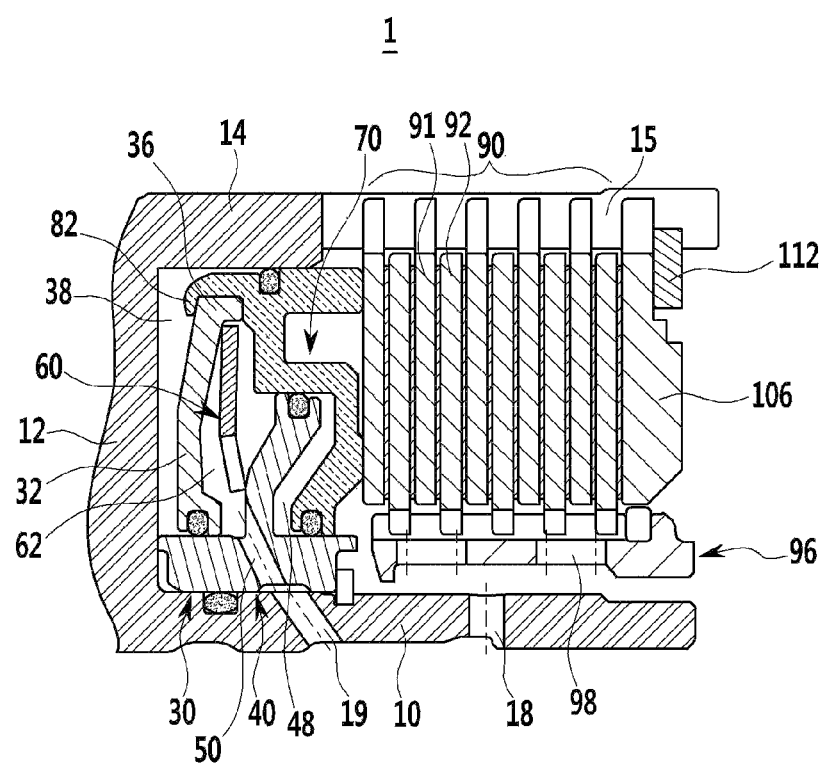

[FIG. 3]
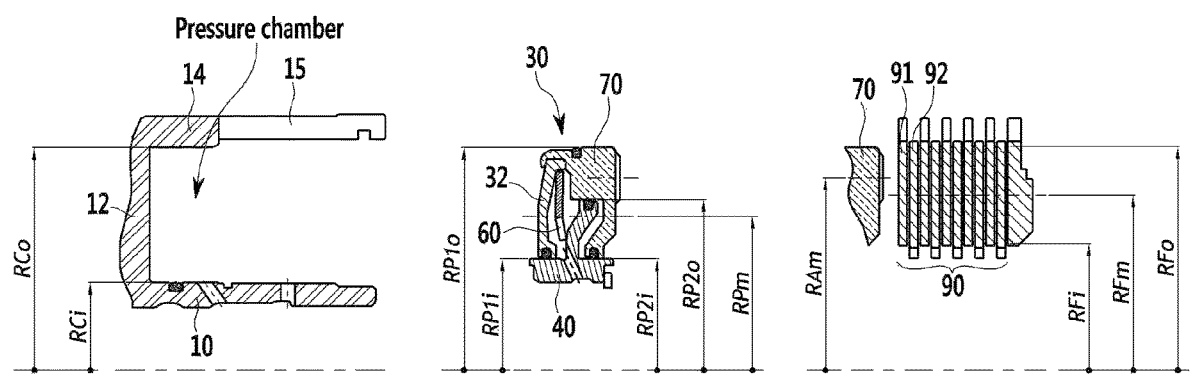

[FIG. 4]
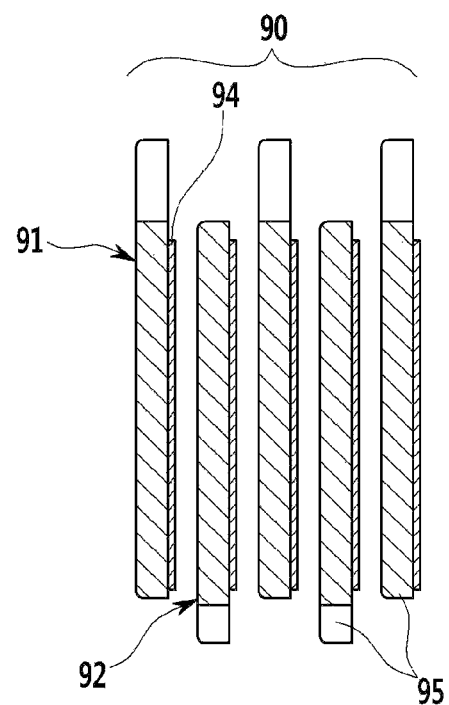

[FIG. 5]
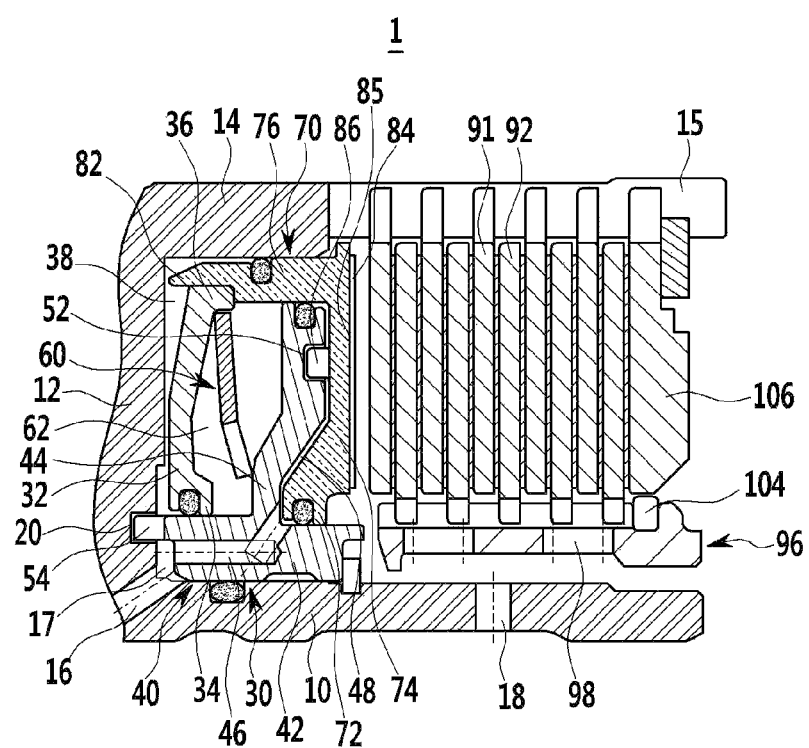

[FIG. 6]
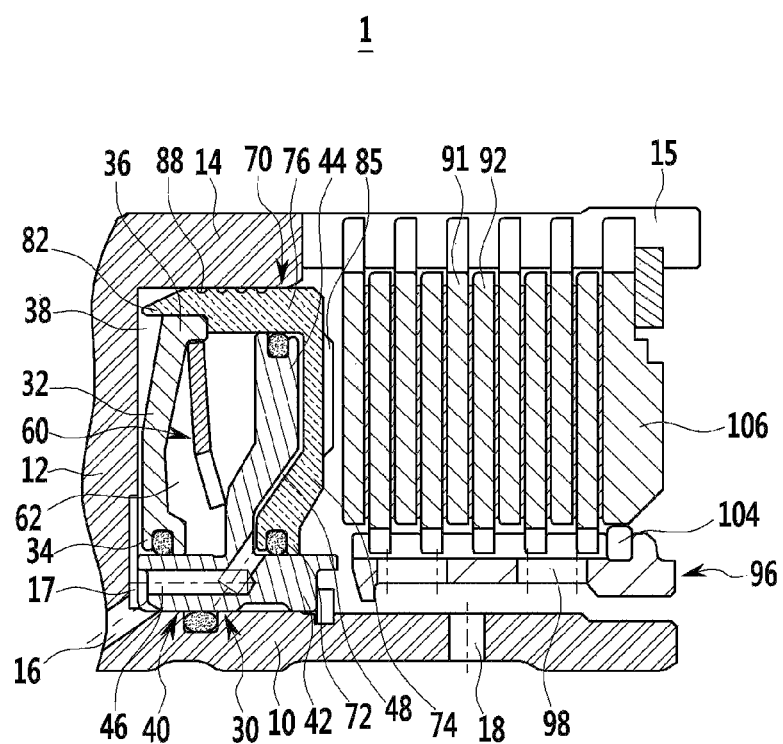

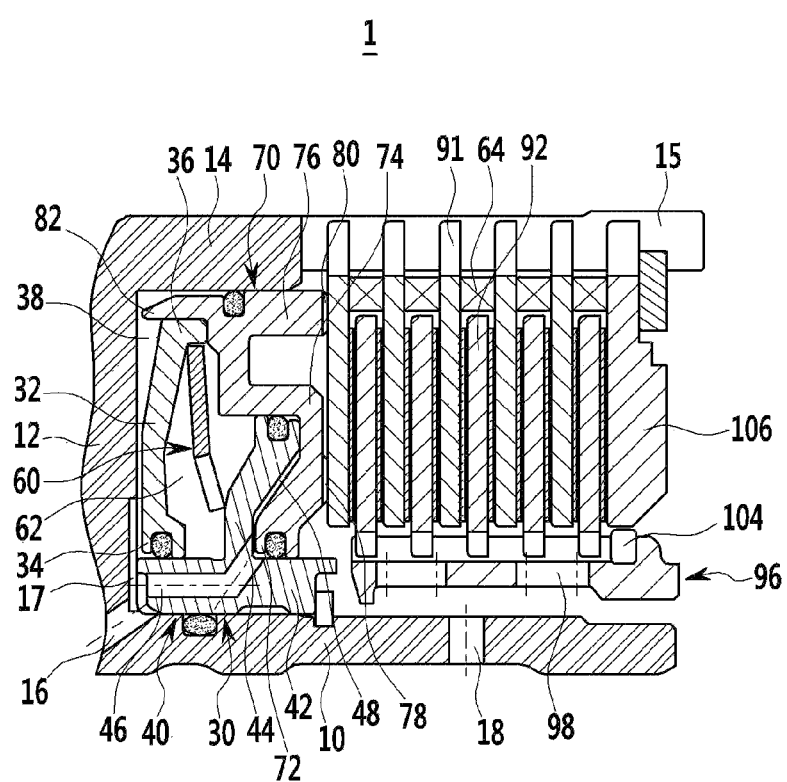
[FIG. 7]

[FIG. 8]
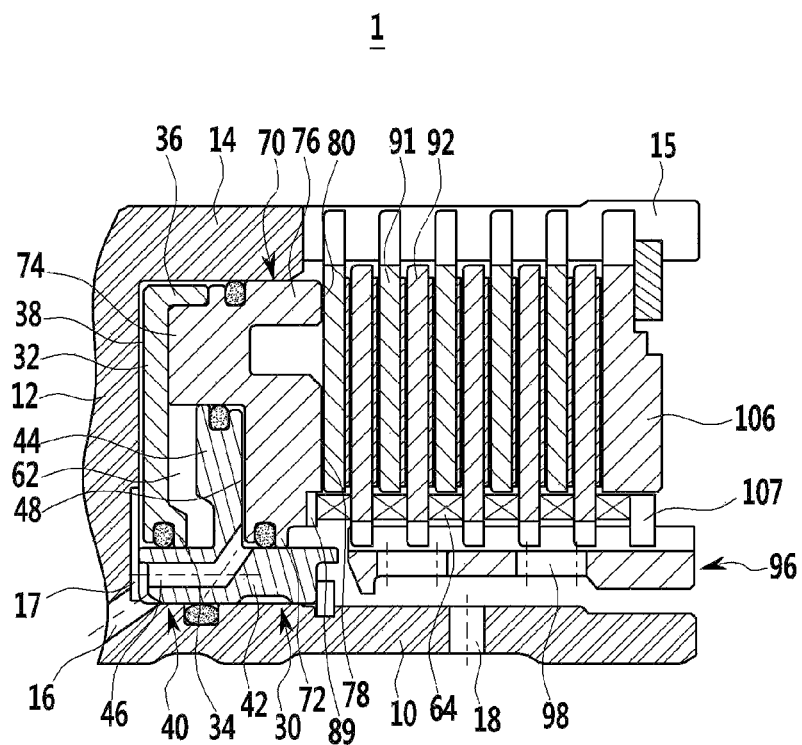

[FIG. 9]
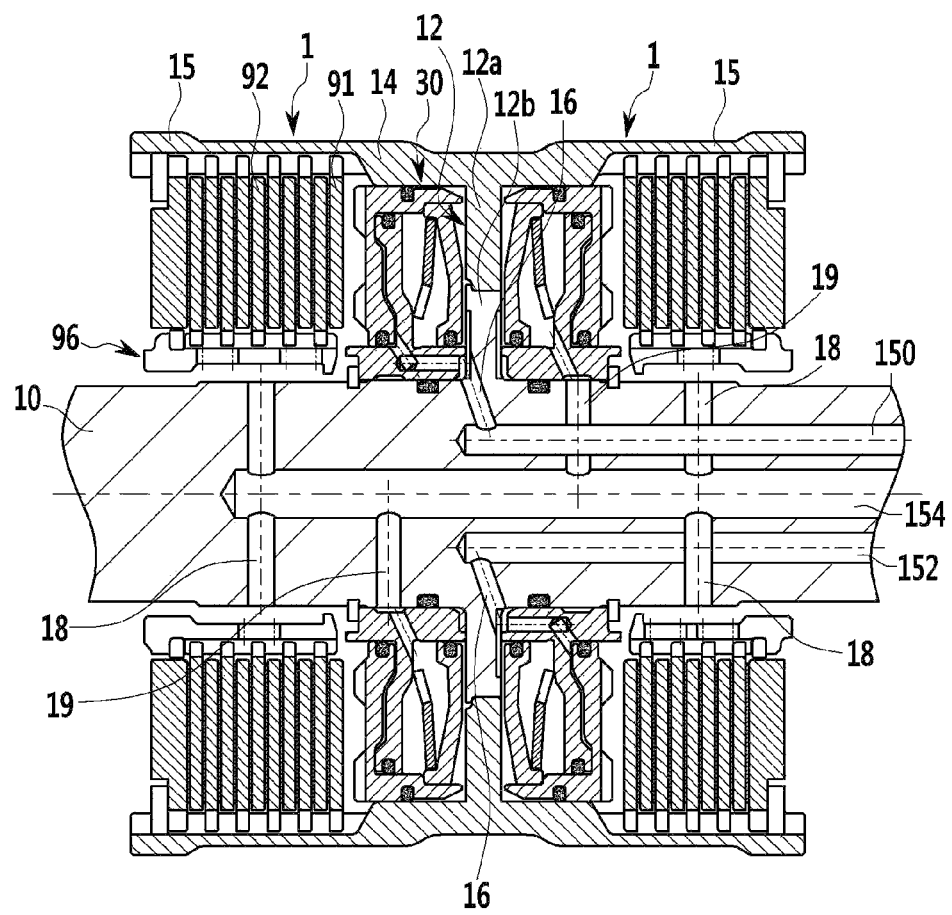

[FIG. 10]
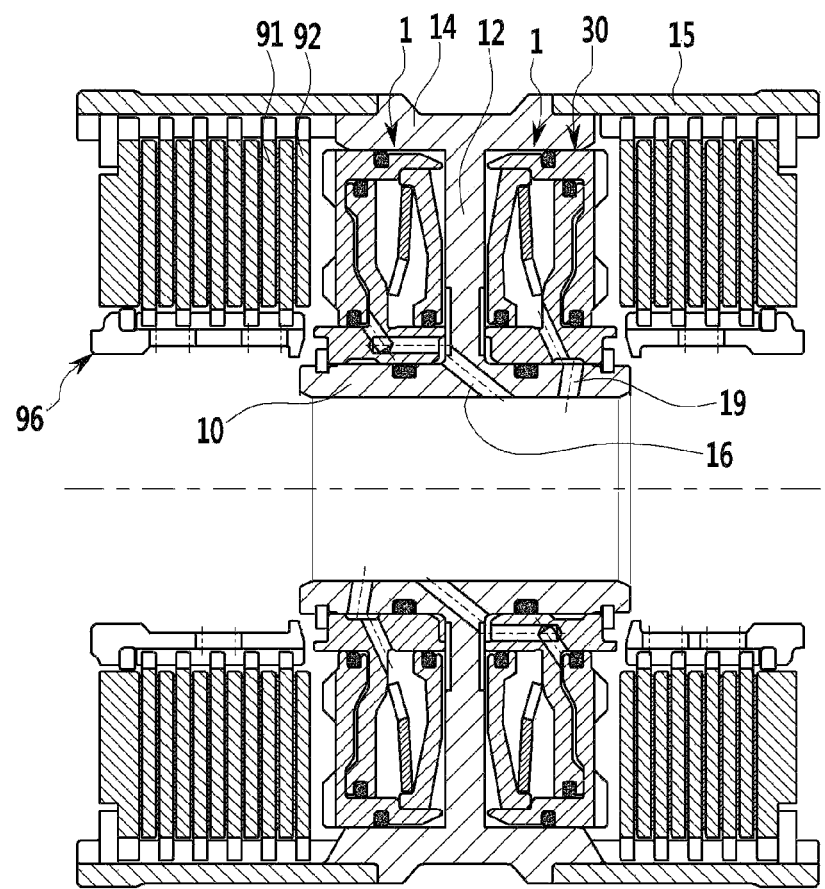

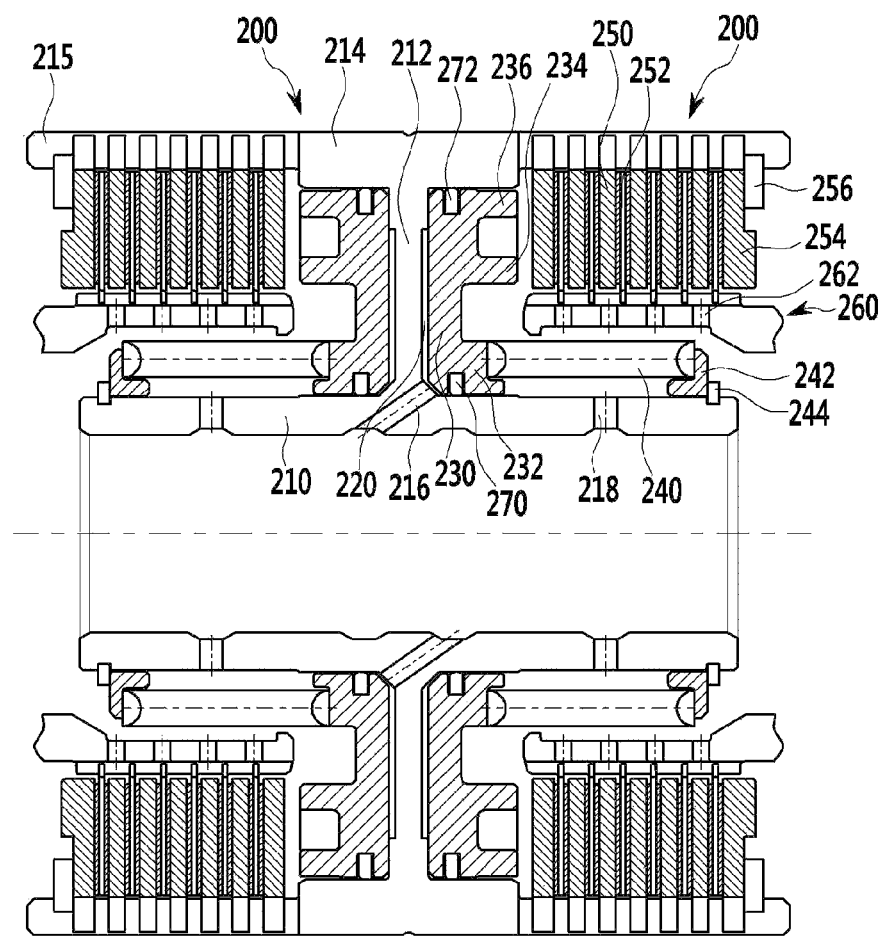
[FIG. 11]

POWER TRANSMISSION DEVICE PROVIDED WITH MORE THAN TWO PISTONS

TECHNICAL FIELD

The present invention relates to a power transmission device including two or more pistons. More particularly, the present invention relates to a power transmission device that is applicable to agricultural machinery or construction equipment such as tractors, forklift trucks, etc., industrial machinery, or vehicles.

BACKGROUND

In general, a power transmission device is used to selectively transmit power of one member to another member. The power transmission device is also used to stop a rotating member.

Referring to FIG. 11, a conventional power transmission device for a tractor will be briefly described.

As shown in FIG. 11, two power transmission devices 200 are disposed on one input shaft (not shown). Each power transmission device 200 includes a housing that forms a mounting space and shares at least a portion of the housing with the other power transmission device 200. That is, each housing includes a clutch hub 210, a clutch connecting portion 212, a clutch housing 214 and a disk housing 215, and the two housings share the clutch connecting portion 212 in common.

Each power transmission device 200 further includes a piston 230, first and second friction disks 250 and 252, a return spring 240 and a power transmission hub 260.

The piston 230 is mounted in the housing and forms a piston chamber 220 between the housing and the piston 230. If an operating hydraulic pressure is supplied into the piston chamber 220, the piston 230 can move in the housing in an axial direction. In addition, an operating hydraulic pressure supply line 216 is formed in the clutch hub 210 or the clutch connecting portion 212 to supply the operating hydraulic pressure into the piston chamber 220. Sealing members 270 and 272 are mounted between a piston interior circumferential portion 232 and the clutch hub 210 and between a piston exterior circumferential portion 236 and the clutch housing 214 to prevent an operation oil that is supplied into the piston chamber 220 from leaking from the piston chamber 220. In addition, the piston exterior circumferential portion 236 and a piston middle portion 234 are protruded in an opposite direction to the piston chamber 220 to form two pushing portions.

The disk housing 215 extends from the clutch housing 214 in the axial direction and a plurality of first friction disks 250 are splined to an interior circumference of the disk housing 215. In addition, a plurality of second friction disks 252 are splined to an exterior circumference of the power transmission hub 260 and are alternately disposed with the plurality of first friction disks 250. In addition, a supporting plate 254 is splined to the disk housing 215 and movement of the supporting plate 254 in the axial direction is restricted by a snap ring 256 mounted at the disk housing 215. The supporting plate 254 supports the first friction disks 250 and the second friction disks 252 in the axial direction to be frictionally coupled to each other.

A spring supporting member 242 is disposed on the clutch hub 210 at an opposite side to the piston chamber 220 and a return spring 240 is disposed between the piston interior circumferential portion 232 and the spring supporting member 242. Movement of the spring supporting member 242 in the axial direction is restricted by a snap ring 244 mounted on the clutch hub 210. Therefore, the return spring 240 exerts a spring load counteracting against an axial force generated by the operating hydraulic pressure on the piston 230. In addition, passages 218 and 262 through which a cooling oil is supplied are formed in the clutch hub 210 and the power transmission hub 260.

According to the power transmission device 200, if the operation oil is supplied into the piston chamber 220 through the operating hydraulic pressure supply line 216, the piston 230 moves to one side in the axial direction and frictionally couples the first friction disk 250 and the second friction disk 252. Therefore, rotational power of the input shaft is transmitted to the power transmission hub 260. On the contrary, if the operation oil supplied into the piston chamber 220 is exhausted from the piston chamber 220, the piston 230 moves to the other side in the axial direction by the spring load of the return spring 240. Therefore, the first friction disk 250 and the second friction disk 252 are spaced from each other and the rotational power of the input shaft is not transmitted to the power transmission hub 260.

According to the conventional power transmission device 200, the return spring 240 is disposed between the power transmission hub 260 and the clutch hub 210 in a radial direction. Therefore, area of the first friction disks 250 and the second friction disks 252 cannot be sufficiently increased if an exterior diameter of the housing is not increased. If the area of the first friction disks 250 and the second friction disks 252 are increased, a mass of a core plate, that is a heat sink mass is increased, thereby increasing a thermal capacity of the power transmission device (please see FIG. 4).

In addition, two housings and two clutch hubs 210 are integrally formed with each other in the conventional power transmission device 200. That is, a cylinder having a suitable diameter is manufactured and the housing is then manufactured by cutting an inside of the cylinder. Therefore, manufacturing cost of the housing is very high.

In addition, when the power transmission device 200 is released, the operation oil may not be exhausted from the piston chamber 220 completely and remain in the piston chamber 220 due to centrifugal force. In order to exhaust the operation oil remaining in the piston chamber 220 completely, a balance chamber should be formed in the piston 230 to supply a balance hydraulic pressure. The conventional power transmission device 200, however, does not include the balance chamber.

Recently, research to increase the magnitude of the axial force applied to the piston while reducing the magnitude of the operating hydraulic pressure in the power transmission device has actively been in progress. Accordingly, a technique for mounting two or more pistons in one power transmission device has been undergoing development.

As the number of pistons is increased, the piston area to which the operating hydraulic pressure is applied is expanded, thereby increasing the magnitude of the axial force applied to the pistons and increasing torque capacity of the power transmission device. However, if the magnitude of the axial force applied to the pistons is increased, a return spring force that is applied against the axial force also needs to be increased. Particularly, it is very important to appropriately determine the return spring force in order to properly operate the power transmission device including two or more pistons. However, the research on determination of the return spring force has not yet progressed.

Because the power transmission device provided with two or more pistons increases an axial force applied onto the friction disks, pressure applied onto the friction disks needs to be distributed evenly to increase lifespan of the friction disks. In addition, research on improving a thermal capacity of the power transmission device by increasing a heat sink mass of the friction disks is necessary.

DETAILED DESCRIPTION OF THE INVENTION

[Technical Object]

The present invention has been made in an effort to provide a power transmission device having advantages of increasing torque capacity and thermal capacity and improving durability.

In addition, another embodiment of the present invention provides a power transmission device having further advantages of increasing a lifespan of friction material and improving durability of the friction material.

Yet another embodiment of the present invention provides a power transmission device having further advantages of having simple manufacturing processes and reducing manufacturing cost.

Means for Achieving Object

A power transmission device according to one aspect of the present invention may include: a housing arranged to form a mounting space by connecting a clutch housing, a clutch connecting portion, a clutch hub and a disk housing to each other; a power transmission hub selectively and operably connected to the housing; a plurality of first friction disks splined to an interior circumference of the disk housing; a plurality of second friction disks splined to an exterior circumference of the power transmission hub and disposed alternately with the first friction disks; a piston module including two or more pistons, each of which has a corresponding piston chamber, and selectively and frictionally coupling the first friction disks with the second friction disks by an operating hydraulic pressure supplied to the piston chambers; and at least one return spring or at least one separating spring supplying a spring load counteracting against an axial force generated by the operating hydraulic pressure, and disposed at an inside or an outside of the piston module, wherein friction material is attached to any one surface or both surfaces of each first friction disk or each second friction disk, and wherein a ratio (k) of an outer radius (RFo) of the friction material to an inner radius (RFi) of the friction material is within a range of 1.30<k<2.20.

In various exemplary embodiments, the piston module includes a first piston forming a first piston chamber and a second piston forming a second piston chamber, wherein the first piston and the second piston are movable together in an axial direction by an operating hydraulic pressure supplied into the first piston chamber or the second piston chamber and the spring load of the at least one return spring or the at least one separating spring.

In various exemplary embodiments, the first piston is arranged to apply the axial force onto the first friction disks or the second friction disks through the second piston such that the axial force generated by the operating hydraulic pressure supplied to the first piston chamber and the axial force generated by the operating hydraulic pressure supplied to the second piston chamber are added and exerted onto the first friction disk or the second friction disk.

In various exemplary embodiments, two or more pushing portions for applying the axial force onto the first friction disk or the second friction disk are formed at the second piston, and the two or more pushing portions are spaced from each other in a radial direction.

In various exemplary embodiments, friction material is attached to any one surface of each first friction disk and each second friction disk, wherein a ratio (k) of an outer radius (RFo) of the friction material to an inner radius (RFi) of the friction material is within a range of 1.50<k<2.00.

In various exemplary embodiments, the piston module may include: a retainer disposed on the clutch hub, a movement of the retainer in the axial direction being limited; a first piston including a first piston interior circumferential portion and a first piston exterior circumferential portion and forming a first piston chamber between the first piston and the housing, the first piston interior circumferential portion being movable on the retainer in the axial direction; and a second piston including a second piston interior circumferential portion and a second piston exterior circumferential portion and forming a second piston chamber between the second piston and the retainer, wherein the second piston interior circumferential portion is spaced from the first piston interior circumferential portion in the axial direction by the retainer and is movable on the retainer in the axial direction, and the second piston exterior circumferential portion contacts with the first piston exterior circumferential portion, wherein the at least one return spring is disposed between the first piston and the retainer to apply the spring load onto the first piston.

In various exemplary embodiments, the retainer fluidly communicates the first piston chamber with the second piston chamber such that the same operating hydraulic pressure is supplied to the first piston chamber and the second piston chamber.

In various exemplary embodiments, the retainer, the first piston and the second piston forms a balance chamber, and a hydraulic line for supplying a balance hydraulic pressure to the balance chamber is formed in the retainer.

In various exemplary embodiments, an additional friction material is attached to a surface of the second piston facing the first friction disks or the second friction disks, and the second piston is arranged to push the first friction disks or the second friction disks through the additional friction material.

In various exemplary embodiments, a stopper recess may be formed at one of the second piston and the retainer facing each other and a rotation stopper that is insertable into the stopper recess is formed at the other of the second piston and the retainer facing each other. In addition, the stopper recess may be formed at one of the retainer and the clutch housing facing each other and the rotation stopper that is insertable into the stopper recess is formed at the other of the retainer and the clutch housing facing each other.

In various exemplary embodiments, a cooling oil for cooling the first friction disks and the second friction disks is supplied through the clutch hub and the power transmission hub, wherein a supporting plate for supporting the first friction disks and the second friction disks in the axial direction is provided at the disk housing, and wherein a dam ring or a spring supporting member is mounted at a position of the power transmission hub corresponding to the supporting plate.

In various exemplary embodiments, the at least one separating spring is disposed between neighboring first friction disks or between the supporting plate and the first friction disk adjacent to the supporting plate at a radial outer position of the second friction disks.

In various exemplary embodiments, the at least one separating spring is disposed between neighboring second friction disks or between the supporting plate and the second friction disk adjacent to the supporting plate at a radial inner position of the first friction disks.

In various exemplary embodiments, the at least one separating spring is disposed between the piston module and the second friction disk adjacent to the piston module at the radial inner position of the first friction disks, and the piston module is provided with a sliding bearing for rotatably supporting the separating spring.

In various exemplary embodiments, the clutch connecting portion includes a first radially extended portion and a second radially extended portion connected to each other, the clutch housing, first radially extended portion and the disk housing are integrally formed by a method such as flow forming, the clutch hub and the second radially extended portion are integrally formed on the input shaft, and the first radially extended portion and the second radially extended portion are coupled to form a housing by means of welding, etc.

In various exemplary embodiments, the clutch housing, the clutch hub and the clutch connecting portion are integrally formed with each other, and the disk housing is separately formed through a method such as press forming and is coupled to the clutch housing to form the housing by means of welding, etc.

A power transmission device according to another aspect of the present invention may include: a housing arranged to form a mounting space by connecting a clutch housing, a clutch connecting portion, a clutch hub and a disk housing to each other; a power transmission hub selectively and operably connected to the housing; a plurality of first friction disks splined to an interior circumference of the disk housing; a plurality of second friction disks splined to an exterior circumference of the power transmission hub and disposed alternately with the first friction disks; a piston module including two or more pistons, each of which has a corresponding piston chamber, and selectively and frictionally coupling the first friction disks with the second friction disks by an operating hydraulic pressure supplied to the piston chambers; and at least one return spring or at least one separating spring supplying a spring load counteracting against an axial force generated by the operating hydraulic pressure, and disposed at an inside or an outside of the piston module, wherein the spring load $F_s$ (kgf) of the at least one return spring or the at least one separating spring acting on the piston module is within a range of $$0.45 \text{ bar} \leq \frac{F_s}{A} \leq P - 1.2\frac{A^c}{A} \times (P-1 \text{ bar}).$$

where "A" (cm$^2$) indicates a total piston area of the two or more pistons, "P" (kgf/cm$^2$) indicates the operating hydraulic pressure, "$A^c$" (cm$^2$) indicates a pressure chamber area formed by the housing, and 1 bar is 1.019716 kgf/cm$^2$.

In various exemplary embodiments, the spring load $F_s$ of the at least one return spring or the at least one separating spring acting on the piston module is within a range of $$0.5 \leq \frac{F_s}{A} \leq 1.8.$$

In various exemplary embodiments, the more than two pistons are arranged to be movable together with each other in an axial direction such that axial forces of the more than two pistons by the operating hydraulic pressure are added.

In various exemplary embodiments, the piston module may include: a retainer disposed on the clutch hub, a movement of the retainer in the axial direction being limited; a first piston including a first piston interior circumferential portion and a first piston exterior circumferential portion and forming a first piston chamber between the first piston and the housing, the first piston interior circumferential portion being movable on the retainer in the axial direction; and a second piston including a second piston interior circumferential portion and a second piston exterior circumferential portion and forming a second piston chamber between the second piston and the retainer, wherein the second piston interior circumferential portion is spaced from the first piston interior circumferential portion in the axial direction by the retainer and is movable on the retainer in the axial direction, and the second piston exterior circumferential portion contacts with the first piston exterior circumferential portion, wherein the return spring is disposed between the first piston and the retainer to apply the spring load onto the first piston.

In various exemplary embodiments, the retainer fluidly communicates the first piston chamber with the second piston chamber such that the same operating hydraulic pressure is supplied to the first piston chamber and the second piston chamber.

In various exemplary embodiments, the retainer, the first piston and the second piston forms a balance chamber, and a hydraulic line for supplying a balance hydraulic pressure to the balance chamber is formed in the retainer.

In various exemplary embodiments, a cooling oil for cooling the first friction disks and the second friction disks is supplied through the clutch hub and the power transmission hub, wherein a supporting plate for supporting the first friction disks and the second friction disks in the axial direction is mounted at the disk housing, and wherein a dam ring or a spring supporting member is mounted at a position of the power transmission hub corresponding to the supporting plate.

In various exemplary embodiments, the at least one separating spring is disposed between neighboring first friction disks or between the supporting plate and the first friction disk adjacent to the supporting plate at a radial outer position of the second friction disks.

In various exemplary embodiments, the at least one separating spring is disposed between neighboring second friction disks or between the supporting plate and the second friction disk adjacent to the supporting plate at a radial inner position of the first friction disks.

In various exemplary embodiments, the at least one separating spring is disposed between the piston module and the second friction disk adjacent to the piston module at the radial inner position of the first friction disks, and the piston module is provided with a sliding bearing for rotatably supporting the separating spring.

In various exemplary embodiments, the clutch connecting portion includes a first radially extended portion and a second radially extended portion connected to each other, the clutch housing, first radially extended portion and the disk housing are integrally formed by a method such as flow forming, the clutch hub and the second radially extended portion are integrally formed on the input shaft, and the first radially extended portion and the second radially extended portion are coupled to form a housing by means of welding, etc.

In various exemplary embodiments, the clutch housing, the clutch hub and the clutch connecting portion are integrally formed with each other, and the disk housing is separately formed through a method such as press forming and is coupled to the clutch housing to form the housing by means of welding, etc.

A power transmission device according to other aspect of the present invention may include: a housing arranged to form a mounting space by connecting a clutch housing, a clutch connecting portion, a clutch hub and a disk housing to each other; a power transmission hub selectively and operably connected to the housing; a plurality of first friction disks splined to an interior circumference of the disk housing; a plurality of second friction disks splined to an exterior circumference of the power transmission hub and disposed alternately with the first friction disks; a piston module including two or more pistons, each of which has a corresponding piston chamber, and selectively and frictionally coupling the first friction disks with the second friction disks by an operating hydraulic pressure supplied to the piston chambers; and at least one return spring or at least one separating spring supplying a spring load counteracting against an axial force generated by to the operating hydraulic pressure, and disposed at an inside or an outside of the piston module, wherein at least one pushing portion for directly exerting the axial force onto the first friction disk or the second friction disk is formed at at least one of the two or more pistons included in the piston module, and wherein a ratio (u) of an average radius (RAm) of the at least one pushing portion to an average radius (RPm) of the two or more pistons is within a range of $0.70<u<2.0$.

In various exemplary embodiments, friction material is attached to any one surface or both surfaces of each first friction disk or each second friction disk, wherein a ratio (v) of an average radius (RFm) of the friction material to the average radius (RPm) of the two or more pistons is within a range of $0.80<v<1.25$.

In various exemplary embodiments, friction material is attached to any one surface or both surfaces of each first friction disk or each second friction disk, wherein a ratio (z) of an average radius (RFm) of the friction material to the average radius (RAm) of the at least one pushing portion is within a range of $0.80<z<1.20$.

In various exemplary embodiments, the piston module may include: a retainer disposed on the clutch hub, a movement of the retainer in the axial direction being limited; a first piston including a first piston interior circumferential portion and a first piston exterior circumferential portion and forming a first piston chamber between the first piston and the housing, the first piston interior circumferential portion being movable on the retainer in the axial direction; and a second piston including a second piston interior circumferential portion and a second piston exterior circumferential portion and forming a second piston chamber between the second piston and the retainer, wherein the second piston interior circumferential portion is spaced from the first piston interior circumferential portion in the axial direction by the retainer and is movable on the retainer in the axial direction, and the second piston exterior circumferential portion contacts with the first piston exterior circumferential portion, wherein the return spring is disposed between the first piston and the retainer to apply the spring load onto the first piston.

In various exemplary embodiments, the retainer fluidly communicates the first piston chamber with the second piston chamber such that the same operating hydraulic pressure is supplied to the first piston chamber and the second piston chamber.

In various exemplary embodiments, the retainer, the first piston and the second piston forms a balance chamber, and the retainer is arranged to supply a balance hydraulic pressure into the balance chamber.

In various exemplary embodiments, a cooling oil for cooling the first friction disks and the second friction disks is supplied through the clutch hub and the power transmission hub, wherein a supporting plate for supporting the first friction disks and the second friction disks in the axial direction is provided at the disk housing, and wherein a dam ring or a spring supporting member is mounted at a position of the power transmission hub corresponding to the supporting plate.

In various exemplary embodiments, the at least one separating spring is disposed between neighboring first friction disks or between the supporting plate and the first friction disk adjacent to the supporting plate at a radial outer position of the second friction disks.

In various exemplary embodiments, the at least one separating spring is disposed between neighboring second friction disks or between the supporting plate and the second friction disk adjacent to the supporting plate at a radial inner position of the first friction disks.

In various exemplary embodiments, the at least one separating spring is disposed between the piston module and the second friction disk adjacent to the piston module at the radial inner position of the first friction disks, and the piston module is provided with a sliding bearing for rotatably supporting the separating spring.

In various exemplary embodiments, the clutch connecting portion includes a first radially extended portion and a second radially extended portion connected to each other, the clutch housing, first radially extended portion and the disk housing are integrally formed by a method such as flow forming, the clutch hub and the second radially extended portion are integrally formed on the input shaft, and the first radially extended portion and the second radially extended portion are coupled to form a housing by means of welding, etc.

In various exemplary embodiments, the clutch housing, the clutch hub and the clutch connecting portion are integrally formed with each other, and the disk housing is separately formed through a method such as press forming and is coupled to the clutch housing to form the housing by means of welding, etc.

Effect of the Invention

As described above, a piston area where the operating hydraulic pressure is applied is increased by using two pistons according to the exemplary embodiments of the present invention. Therefore, operating force of the pistons are increased and thereby increasing torque capacity of the power transmission device.

In addition, sizes of the friction disks may be increased by disposing the return spring in the piston module. Therefore, a heat sink mass of the friction disks is increased and thereby increasing a thermal capacity of the power transmission device.

In addition, operating pressure applied to the friction material may be reduced because a size of the friction material increases. Therefore, lifespan of the friction material may be improved.

In addition, bending moment and thermal stress generated in the friction disks may be reduced by approaching centers of the pistons to a center of the pushing portion and a center of the friction material as close as possible. Therefore, durability of the power transmission device may be improved.

Furthermore, manufacturing cost may be curtailed by optimizing manufacturing process of the housing in which two or more power transmission devices is mounted.

BRIEF DESCRIPTION OF THE DRAWINGS

FIG. 1 is a cross-sectional view of a power transmission device according to the first exemplary embodiment of the present invention.

FIG. 2 is another cross-sectional view of a power transmission device according to the first exemplary embodiment of the present invention.

FIG. 3 illustrates dimensions required to determine a range of a spring load and a ratio of an outer radius and an inner radius of a friction material and approach centers of pistons to a center of a pushing portion and a center of the friction material in a power transmission device according to exemplary embodiments of the present invention.

FIG. 4 illustrates friction disks, one surface of which friction material is attached.

FIG. 5 to FIG. 8 are cross-sectional views of power transmission devices according to various exemplary embodiments of the present invention.

FIG. 9 to FIG. 10 are cross-sectional views showing that power transmission devices according to exemplary embodiments of the present invention are applied to a tractor.

FIG. 11 illustrates conventional power transmission devices applied to a tractor.

BEST MODE FOR EXECUTING THE INVENTION

Exemplary embodiments of the present invention will hereinafter be described in detail with reference to the accompanying drawings.

FIG. 1 is a cross-sectional view of a power transmission device according to the first exemplary embodiment of the present invention, and FIG. 2 is another cross-sectional view of a power transmission device according to the first exemplary embodiment of the present invention.

For ease of description, it is exemplified in this specification that a power transmission device uses two pistons, but the spirit and the scope of the present invention are not limited to the power transmission device including two pistons. In addition, it is exemplified in this specification that the power transmission device is applied to a tractor, but the power transmission device according to the exemplary embodiments of the present invention can be applicable to various agricultural machinery, construction equipment, industrial machinery or vehicles.

As shown in FIG. 1 and FIG. 2, a power transmission device 1 according to the first exemplary embodiment of the present invention includes a housing 10, 12, 14 and 15, a disk pack 90, a piston module 30 and a power transmission hub 96.

The housing serves to form a mounting space. For ease of description, it is exemplified in the first exemplary embodiment of the present invention, but is not limited, that the housing is integrally formed. In order to simplify manufacturing process, the housing may be formed by coupling two or more members with each other through means such as welding, press-fitting or serration, etc. The housing includes a clutch hub 10, a clutch connecting portion 12, a clutch housing 14 and a disk housing 15.

The clutch hub 10 is directly or operably connected to an input shaft (not shown). Alternatively, the input shaft may be used as the clutch hub 10. The clutch hub 10 extends in an axial direction from one side to the other side, and an operating hydraulic pressure supply line 16, a cooling oil supply line 18 and a first balance hydraulic pressure supply line 19 are formed in the clutch hub 10.

In this specification and claims, when two members are described to be "operatively connected" to each other, this indicates that two members that can rotate with respect to each other are connected to each other to rotate together.

The clutch connecting portion 12 extends in a radial direction from one end of the clutch hub 10. A first piston supply line 17 connected to the operating hydraulic pressure supply line 16 is formed in the clutch connecting portion 12.

The clutch housing 14 extends from a radial outer end of the clutch connecting portion 12 toward the other side, and the disk housing 15 extends from the other end of the clutch housing 14 further toward the other side.

The disk pack 90 selectively connects the housing to the power transmission hub 96 so as to selectively transmit rotational power of the input shaft to the power transmission hub 96 through the housing. The disk pack 90 includes a plurality of first friction disks 91 and a plurality of second friction disks 92.

The first and the second friction disks 91 and 92 may be formed by attaching friction material 94 onto one surface or both surfaces of a core plate 95 that is made of steel material (please see FIG. 4). In a case that the friction material 94 is attached onto the both surfaces of the second friction disk 92, the friction material 94 may not be attached onto the first friction disk 91 and only the core plate 95 may be used as the first friction disk 91.

The plurality of first friction disks 91 are coupled to an interior circumference of the disk housing 15 by means of spline or teeth, etc. A supporting plate 106 is coupled to the interior circumference of the disk housing 15 at the other side of the plurality of first friction disks 91 by means of spline or teeth, etc., and movement of the supporting plate 106 toward the other side in the axial direction is restricted by a snap ring 112 mounted onto the interior circumference of the disk housing 15. Because movement of the supporting plate 106 toward the other side in the axial direction is restricted, the supporting plate 106 causes the first friction disks 91 and the second friction disks 92 to closely contact and frictionally coupled with each other. That is, one surface of the supporting plate 106 is configured to contact with the second friction disk 92 and the other surface of the supporting plate 106 is configured to contact with the snap ring 112.

The plurality of second friction disks 92 are alternately disposed with the plurality of first friction disks 91. That is, one second friction disk 92 is disposed between neighboring first friction disks 91. In addition, the plurality of second friction disks 92 are splined to an exterior circumference of the power transmission hub 96.

If an axial force is applied to the first friction disks 91, the first friction disks 91 move in the axial direction and are frictionally coupled to the second friction disks 92. Therefore, the rotational power of the input shaft is transmitted to the power transmission hub 96 through the housing.

The piston module 30 is mounted in the mounting space of the housing and may include a first piston 32, a retainer 40, a return spring 60 and a second piston 70. The piston module 30 pushes the disk pack 90 toward the other side in the axial direction when an operating hydraulic pressure is supplied, and is separated from the disk pack 90 when the operating hydraulic pressure is not supplied.

The first piston 32 is disposed in the mounting space and a first piston chamber 38 is formed between the first piston 32 and the clutch connecting portion 12. The first piston chamber 38 is fluidly communicated with the first piston supply line 17 to receive an operation oil. The first piston 32 is a plate of doughnut) and hook shape, and includes a first piston interior circumferential portion 34 and a first piston exterior circumferential portion 36.

The retainer 40 is disposed on the clutch hub 10 and movement of the retainer 40 in the axial direction is restricted. The retainer 40 includes a retainer body 42 and a retainer wall 44.

The retainer body 42 extends in the axial direction and is disposed on the clutch hub 10. One end of the retainer body 42 contacts with the clutch connecting portion 12 and the other end of the retainer body 42 is prevented from moving in the axial direction by a snap ring 110 mounted on the clutch hub 10. In addition, a second piston supply line 46 fluidly communicated with the operating hydraulic pressure supply line 16 or the first piston supply line 17 and a second balance hydraulic pressure supply line 50 fluidly communicated with the first balance hydraulic pressure supply line 19 are formed in the retainer body 42 (please see FIG. 2). That is, the second piston supply line 46 is formed at a predetermined specific position along a circumferential direction of the retainer body 42 (please see FIG. 1), and the second balance hydraulic pressure supply line 50 is formed at another predetermined position along the circumferential direction of the retainer body 42 (please see FIG. 2). Therefore, the second piston supply line 46 and the second balance hydraulic pressure supply line 50 are alternately formed along the circumferential direction. In addition, the second piston supply line 46 and the second balance hydraulic pressure supply line 50 are not fluidly communicated with each other. A sealing member 130 is mounted between the retainer body 42 and the clutch hub 10.

The first piston 32 and the second piston 70 are arranged to be movable on the retainer body 42 in the axial direction. In addition, sealing members 132 and 136 are mounted respectively between the first piston interior circumferential portion 34 and the retainer body 42, and between the second piston interior circumferential portion 72 and the retainer body 42.

The retainer wall 44 extends from a predetermined position of the retainer body 42 in a radial outward direction. The retainer wall 44 causes the first piston interior circumferential portion 34 and the second piston interior circumferential portion 72 to be apart from each other in the axial direction and fluidly separates the first piston interior circumferential portion 34 and the second piston interior circumferential portion 72.

The second piston 70 is disposed on the retainer body 42 at an opposite side of the first piston 32 in the axial direction with reference to the retainer wall 44 as the center. The second piston 70 includes a second piston body 74 and a second piston exterior circumferential portion 76.

The second piston body 74 includes a first radially extended portion extending firstly from the second piston interior circumferential portion 72 in the radial direction, an axially extended portion extending from a radial outer end of the first radially extended portion in the axial direction and a second radially extended portion extending from one end of the axially extended portion again in the radial direction. The axially extended portion closely contacts with a radial outer end of the retainer wall 44 such that the retainer 40 and the second piston body 74 form a second piston chamber 48. The second piston chamber 48 is fluidly communicated with the second piston supply line 46. Therefore, the same operating hydraulic pressure can be supplied into the first piston chamber 38 and the second piston chamber 48. In addition, a sealing member 138 is mounted between the axially extended portion and the radial outer end of the retainer wall 44.

The second piston exterior circumferential portion 76 extends from a radial outer end of the second radially extended portion of the second piston body 74 toward both sides in the axial direction. A caulking portion 82 is formed at one end of the second piston exterior circumferential portion 76 and the other end of the second piston exterior circumferential portion 76 is disposed close to the disk pack 90. The first piston exterior circumferential portion 36 is press-fitted to an interior circumference of one end portion of the second piston exterior circumferential portion 76, and the caulking portion 82 wraps an edge of the first piston exterior circumferential portion 36 such that the first piston exterior circumferential portion 36 and the second piston exterior circumferential portion 76 are coupled to each other (please see FIG. 2). Therefore, the first piston 32 and the second piston 70 moves together in the axial direction, and an axial force generated by the operating hydraulic pressure supplied to the first piston chamber 38 and an axial force generated by the operating hydraulic pressure supplied to the second piston chamber 48 are added and exerted onto the disk pack 90.

In some cases, tight fit of the first piston exterior circumferential portion 36 and the second piston exterior circumferential portion 76 may achieve sealing and coupling effect. In this case, caulking may be omitted (please see FIG. 8). Besides, the first piston 32 and the second piston 70 can be connected by various coupling means such as bonding, welding, screws, pins, punching, and etc. according to the exemplary embodiments of the present invention, and it is to be understood that the various coupling means are included in the scope of the present invention.

In addition, one modification of the exemplary embodiments of the present invention is that the first piston 32 and the second piston 70 are not coupled to each other and are disposed in the piston module 30 at a decoupled state and a portion of the first piston 32 contacts with and applies the axial force to the second piston 70.

In the exemplary embodiments of the present invention, the first piston 32, the retainer 40 and the second piston 70 form a balance chamber 62 by coupling the first piston exterior circumferential portion 36 and the second piston exterior circumferential portion 76 to each other. The balance chamber 62 is fluidly communicated with the first balance hydraulic pressure supply line 19 and the second balance hydraulic pressure supply line 50 so as to receive a balance hydraulic pressure.

The return spring 60 is mounted in the balance chamber 62. One end of the return spring 60 is supported by the first piston 32 and the other end of the return spring 60 is supported by the retainer wall 44 such that the return spring 60 exerts a spring load counteracting against the axial force generated by the operating hydraulic pressure supplied into the first piston chamber 38 and the second piston chamber 48 onto the first piston 32. It is illustrated in FIG. 1 and FIG. 2 that the return spring 60 is a disk spring, but the return spring 60 is not limited to a disk spring. For example, any means such as a coil spring, a wave spring, a rubber spring, etc. which can provide elastic force may be used as the return spring 60.

It is exemplified according to the present exemplary embodiment but is not limited that the return spring 60 is disposed in the piston module 30. It is to be understood that a case where the return spring 60 is mounted at the exterior of the piston module and applies an elastic force to the first piston 32 or the second piston 70 is included in the scope of the present invention.

In addition, the return spring 60 may be mounted between the retainer 40 and the second piston 70. In this case, the return spring 60 may be a tension spring which generates tension according to movements of the pistons 32 and 70.

In the exemplary embodiments of the present invention, the second piston exterior circumferential portion 76 closely contacts with an interior circumference of the clutch housing 14, and a sealing member 134 is mounted between the second piston exterior circumferential portion 76 and the clutch housing 14.

First and second pushing portions 78 and 80 are formed respectively at the first radially extended portion of the second piston body 74 and the other end of the second piston exterior circumferential portion 76. The first and the second pushing portions 78 and 80 may be radially spaced from each other so as to apply pressure to the disk pack 90 uniformly and be formed substantially at the same position in the axial direction. However, the exemplary embodiments of the present invention are not limited to this and include one pushing portion extending long in the radial direction.

The power transmission hub 96 is disposed radially outer of the clutch hub 10. At least one cooling oil supply hole 98 is formed in the power transmission hub 96 such that a cooling oil supplied through the cooling oil supply line 18 is supplied into the disk pack 90 through the cooling oil supply hole 98. First and second protrusions 100 and 102 are protruded in a radial inner direction from both side portions of the power transmission hub 96 with the cooling oil supply hole 98 as the center in the axial direction so as to supply more cooling oil penetrating through the cooling oil supply line 18 into the disk pack 90. In addition, a dam ring 104 is mounted at a position of the power transmission hub 96 corresponding to the supporting plate 106. The dam ring 104 is disposed slightly apart from the supporting plate 106. The dam ring 104 may be made of rubber and etc.

In the first exemplary embodiment of the present invention illustrated in FIG. 1 and FIG. 2, the first and the second pistons 32 and 70, the retainer 40 and the return spring 60 are pre-assembled as one piston module 30 and are then mounted in the housing. In this case, assembling time of the power transmission device 1 may be shortened. However, the exemplary embodiments of the present invention are not limited to this and include a case where the first and the second pistons 32 and 70, the retainer 40 and the return spring 60 are individually assembled in the housing.

Operation of the power transmission device 1 according to the first exemplary embodiment of the present invention will hereinafter be described.

At an initial state, the housing and the power transmission hub 96 of the power transmission device 1 are not operably connected to each other. If the operating hydraulic pressure is supplied into the first piston chamber 38 through the operating hydraulic pressure supply line 16 and the first piston supply line 17 at the initial state, the operating hydraulic pressure is also supplied into the second piston chamber 48 through the second piston supply line 46. The operating hydraulic pressure supplied into the first and the second piston chambers 38 and 48 push the first piston 32 and the second piston 70 to the right in the drawings, respectively. In addition, because the first piston 32 and the second piston 70 are configured to be movable together in the axial direction, axial forces of the first piston 32 and the second piston 70 are added up. Resultantly, the first and the second pushing portions 78 and 80 of the second piston 70 push the first friction disks 90 to the right in the drawings, and the first friction disk 91 and the second friction disk 92 are frictionally coupled to each other. Therefore, the rotational power of the input shaft is transmitted to the power transmission hub 96 through the housing.

If the operating hydraulic pressure supplied to the first and the second piston chambers 38 and 48 is exhausted at an engaged state, the return spring 60 pushes the first piston 32 to the left in the drawings. In this case, because the first piston 32 and the second piston 70 are configured to be movable together in the axial direction, the first piston 32 and the second piston 70 move together to the left in the drawings and decouples the housing from the power transmission hub 96 of the power transmission device 1.

Even though the operating hydraulic pressure is exhausted, the power transmission device 1 may not be completely released. That is, the operation oil in the first and the second piston chambers 38 and 48 is not exhausted completely by a centrifugal force, and thus a centrifugal hydraulic pressure may be applied onto the first and the second pistons 32 and 70. In this case, the balance hydraulic pressure is supplied into the balance chamber 62 through the first and the second balance hydraulic pressure supply lines 19 and 50. The balance hydraulic pressure supplied into the balance chamber 62 counteracts against the centrifugal hydraulic pressure to push the first and the second pistons 32 and 70 to the left in the drawings. Accordingly, the power transmission device 1 is released completely and malfunction of the pistons by the centrifugal hydraulic pressure is prevented at every rotation speed. Therefore, smooth operation and controllability of the power transmission device may be improved.

As described above, in the power transmission device including two or more pistons, the axial force, i.e., a piston load applied to the disk pack 90 increases under the same operating hydraulic pressure by the increased number of the pistons. Therefore, torque capacity of the power transmission device 1 increases.

Since the axial force applied to the disk pack 90 increases, it is necessary to increase the spring load of the return spring counteracting against the axial force.

It is very important to appropriately determine the spring load in order to properly operate the power transmission device including two or more pistons. In FIG. 1 and FIG. 2, it is illustrated that one return spring is used for providing an appropriate spring load, but the present invention is not limited thereto. In other words, one or more return springs may be used in the power transmission device to provide a required spring load range and/or an installation space for the return spring. In this case, the spring load indicates a resultant force of spring loads used for enabling two or more pistons to return to target positions (i.e., a sum of axial loads of one or more return springs that is actually applied to the two or more pistons).

Hereinafter, a method of determining a preferable range of return spring load will be described in detail in accordance with exemplary embodiments of the present invention.

First, an operating force (axial force) of the pistons 32 and 70 in the power transmission device 1 including the two or more pistons is determined as follows. For ease of description, in this specification, the power transmission device including two pistons (see FIG. 1 to FIG. 3) is mainly taken as an example, but it should be understood that the spirit and the scope of the present invention is not limited to the power transmission device including two pistons.

$$F = A \times P - F_s \quad \text{[Formula 1]}$$

$$A = A_1 + A_2 \quad \text{[Formula 2]}$$

Here, "F" indicates the operating force (kgf) of the pistons, "A" indicates a total piston area (cm$^2$) of the power transmission device 1, "P" indicates the operating hydraulic pressure (kgf/cm$^2$), "$F_s$" indicates the return spring load (kgf), "$A_1$" indicates an area (cm$^2$) of the first piston and is calculated by the formula $A_1=\pi(RP1_o^2-RP1_i^2)$, and "$A_2$" indicates an area (cm$^2$) of the second piston and is calculated by the formula $A_2=\pi(RP2_o^2-RP2_i^2)$ see (FIG. 3). In addition, "$RP1_o$" indicates an outer radius of the first piston 32, "$RP1_i$" indicates an inner radius of the first piston 32, "$RP2_o$" indicates an outer radius of the second piston 70, and "$RP2_i$" indicates an inner radius of the second piston 70.

Hereinafter, a preferable method for selecting an appropriate range of the return spring load represented by $F_s$ in Formula 1 will be described.

In the power transmission device 1, the operating hydraulic pressure will drop to "0" after a little time elapses from a time point at which the supply of the operating hydraulic pressure is stopped, in order to stop power transmission. A time at which the operating hydraulic pressure in the piston chamber drops to "0" varies according to, e.g., a centrifugal hydraulic pressure of the piston chamber, a seal resistance, a hydraulic path resistance, a viscosity of the operating fluid, and a control method of a pressure control valve, which are known as main factors effecting a release time of the power transmission device.

When the power transmission device 1 transmits no power, the two pistons should return to an initial position, i.e., an installation position, and stay there. However, in some cases, the two pistons may be positioned where they can push the disk pack or may move to such position due to the aforementioned factors and/or other reasons.

To prevent these phenomena, it is necessary to use the return spring to push the two pistons to the installation position. For this purpose, it is preferable to set the return spring load to be equal to or greater than 1 bar (almost atmospheric pressure, 1 bar=1.019716 kgf/cm$^2$) at an operating position at which the two pistons come into contact with the disk pack. This indicates that it is preferable that the return spring pushes the two pistons from the operating position to the initial position with a pressure of at least 1 bar or more.

This is mathematically represented as follows.

$$\frac{F_{so}}{A} \geq 1 \text{ bar} \quad \text{[Formula 3]}$$

Here, "$F_{so}$" indicates the return spring load (kgf) at the operating position of the two pistons.

When the return spring load is determined at the operating position of the two pistons by Formula 3, the return spring load at the installation position is less than a value calculated by Formula 3. This is because the distance from a free position of the return spring to the installation position is shorter than the distance from the free position to the operation position.

As one nonrestrictive example, in a power transmission device of an automatic transmission, a piston travel, i.e., a distance from the installation position to the operating position approximately ranges from 0.4 mm to 7.0 mm. Further, an available spring constant "k" (Kgf/mm) is restrictive in a current spring design technology. Accordingly, it is preferable to set a return spring load at the installation position to be 60 to 80% of the return spring load at the operating position. This range of the return spring force is suitable for controllability of the power transmission device including two pistons.

Accordingly, Formula 3 may be represented as the following formula.

$$\frac{F_{si}}{A} \geq 0.6 \sim 0.8 \text{ bar} \quad \text{[Formula 4]}$$

Here, "$F_{si}$" indicates the return spring load (kgf) at the installation position of two pistons.

Nowadays, a tolerance of a spring load may be increased to ±25% according to kinds and usages (e.g., in the case that disk springs having load tolerances of ±15% are stacked in series), and thus it is preferable to define a minimum load of the return spring having the greatest spring load tolerance as follows.

$$\frac{F_{si-min}}{A} \geq 0.45 \text{ bar} \quad \text{[Formula 5]}$$

Here, "$F_{si-min}$" indicates the minimum return spring load (kgf) at the installation position of two pistons.

Further, since the return spring load at the installation position is always less than that at the operating position, Formula 5 may be represented as the following formula.

$$F_{s-min} = 0.45 \text{ bar} \times A \quad \text{[Formula 6]}$$

Here, "$F_{s-min}$" indicates the allowable minimum return spring load (kgf).

Accordingly, the spring load calculated by Formula 6 may be selected as the minimum return spring load of the power transmission device including two pistons.

In the power transmission device including two pistons, a total piston area is designed to be larger than the area ($A^c$) of a pressure chamber defined by a housing, a piston, a balance wall, a retainer, and the like (see FIG. 3). As non-limiting examples, in a case of power transmission device of an automatic transmission it is desirable that an operating force of pistons increased by an increased piston area is larger by at least 20% as compared with a load generated by an operating hydraulic pressure which acts on the area ($A^c$) of the pressure chamber in order to obtain appropriate gain from two pistons. This is mathematically represented as the following formula.

$$\frac{F}{F^c} = \frac{A \times P - F_s}{A^c \times P - F_s^c} \cong 1.2 \quad \text{[Formula 7]}$$

Here, "$F^c$" indicates a load (kgf) according to the operating hydraulic pressure (P) acting on the pressure chamber area ($A^c$) formed by the housing, "$A^c$" indicates the area (cm$^2$) of the pressure chamber and is calculated by $A^c=\pi(RC_o^2-RC_i^2)$, and "$F_s^c$" indicates the return spring load (kgf) based on the area of the pressure chamber and is a virtual value. In addition, "$RC_o$" indicates an outer radius of the pressure chamber and "$RC_i$" indicates an inner radius of the pressure chamber.

The pressure chamber is a similar concept to the first piston chamber, but for better comprehension and ease of description, is represented differently from the first piston chamber.

As shown in Formula 7, when the return spring load ($F_s$) is greater than a specific value, the operating force (F) cannot be greater than 20% or more even if the total piston area is increased by 20% or more. Accordingly, in the power transmission device including two pistons, the return spring load at the operating position is required to satisfy the following condition to accomplish an increasing effect of at least 20% or more in a piston operating force.

$$F_{so\text{-}max} \leq A \times P - 1.2 \times (A^c \times P - F_s^c) \qquad \text{[Formula 8]}$$

Here, "$F_{so\text{-}max}$" indicates the maximum return spring load (kgf) at the operating position of two pistons.

Even though $F_s^c$ is a virtual value, the value may be identically defined by Formula 3.

$$\frac{F_s^c}{A^c} \geq 1 \text{ bar} \qquad \text{[Formula 9]}$$

Since the return spring load at the operating position of two pistons is always greater than that at the installation position, Formula 9 is represented as the following formula.

$$F_{s\text{-}max} = A \times P - 1.2 \times (A^c \times P - 1 \text{ bar} \times A^c) \qquad \text{[Formula 10]}$$

Here, "$F_{s\text{-}max}$" indicates the maximum return spring load (kgf).

Accordingly, the return spring load determined by Formula 10 may be selected as the maximum return spring load for the power transmission device including two pistons.

The two formulas may be represented as one formula as follows.

$$0.45 \text{ bar} \leq \frac{F_s}{A} \leq P - 1.2 \frac{A^c}{A} \times (P - 1 \text{ bar}) \qquad \text{[Formula 11]}$$

That is, a resultant return spring load ($F_s$) (kgf) may be set within such a range satisfying Formula 11. For better comprehension and ease of description, the return spring load ($F_s$) will hereinafter represent a sum of axial loads of all the return springs in a case that the two or more return springs are used.

Further, when the engagement and disengagement of the power transmission device is controlled by using a feedback control method or an adaptive control method, it may achieve more precise control of the power transmission device to set the return spring load ($F_s$) (Kgf) within such a range to satisfy the following formula in consideration of a piston seal resistance, a minimum controllable pressure, a linear control range of a solenoid valve, and the like.

$$0.5 \leq \frac{F_s}{A} \leq 1.8 \qquad \text{[Formula 12]}$$

Here, "A" indicates a total piston area (cm$^2$) of the two or more pistons.

When the return spring load is determined within the range of Formula 12, it is possible to further improve shift quality by minimizing torque fluctuation generating when engaging and disengaging the power transmission device.

The units used in the above descriptions and formulas are merely examples for ease of the description. It shall be obvious that the basic spirit and scope of the present invention is identically explainable using other unit system, such as the SI unit system.

The same principle and method suggested in this specification may be applied to a power transmission device including two or more pistons to determine an appropriate range of the return spring load.

According to various exemplary embodiments of the present invention, the return spring 60 is not mounted between the power transmission hub 96 and the clutch hub 10 but is mounted in the piston module 30 different from that in the conventional power transmission device 200 (please see FIG. 11). Therefore, an interior diameter of the disk pack 90 may be minimized and widths of the friction disks 91 and 92 may be increased according to the exemplary embodiments of the present invention. In this case, a volume or a mass of the core plate 95 included in the friction disk is increased, thereby increasing heat sink mass indicating capacity of storing heat generated due to slip when engaging the power transmission device 1. If the heat sink mass of the disk pack 90 increases, it is easy to absorb heat generated when engaging the power transmission device and highest temperature of the friction material 94 can be lowered. Accordingly, lifespan of the disk pack 90 and the power transmission device 1 can be increased.

If the width of the disk pack 90 is increased excessively, however, a difference between an inner radius and an outer radius of the friction disks 91 and 92 increases and excessive thermal stress may occur. This may cause plastic deformation of the friction disks 91 and 92 and the power transmission device 1 may be damaged. Therefore, if a ratio of an outer radius to an inner radius of the friction material 94 is limited to a specific value, sufficient durability may be secured.

In addition, since the axial force applied onto the disk pack 90, i.e., the piston load increases in the power transmission device 1 having more than two pistons according to the exemplary embodiments of the present invention, pressure applied onto the friction material 94 also increases, thereby causing the friction material 94 to be worn out at an early stage. Therefore, it is required not to diminish an area of the friction material 94 of the disk pack 90 in order to improve durability of the friction material 94.

Therefore, durability of the friction material 94 and the power transmission device may be improved by defining the ratio of the outer radius (RFo) to the inner radius (RFi) of the friction material 94 as k and limiting a range of k as follows according to the exemplary embodiments of the present invention.

$$1.30 < k = RF_o/RF_i < 2.20$$

If k is less than 1.30, the area of the friction material 94 is small and the axial force applied to a unit area of the friction material 94 (i.e., operating pressure (p=piston load/friction material area)) increases. Therefore, wear of the friction material 94 increases and lifespan of the friction material 94 may be shortened. In order to solve such problems, if the operating pressure (p) applied onto the friction material 94 is set to be lower than or equal to a maximum allowable pressure (e.g., 90 kgf/cm² in a case of the friction material of paper material), durability may be improved.

If k is greater than 2.20, the difference between the inner radius and the outer radius of the friction material 94 is large and excessive thermal stress may occur in the disk pack 90. This causes plastic deformation of the friction disks 91 and 92 and damage of the power transmission device 1

Therefore, if stress due to thermal strain is controlled to be lower than elastic limit of the core plate 95 (e.g., about 2750 kgf/cm² in a case of SPCC), durability of the friction disks 91 and 92 may be improved.

Furthermore, since the exemplary embodiments of the present invention increases the axial force by using more than two pistons, sufficient torque capacity can be obtained even though friction disks having the friction material 94 attached on only one side surface thereof (single sided disk) is used (please see FIG. 4). As known, if the friction disks 91 and 92 having the friction material 94 on only one side surface is used, mass of the core plate 95 can be increased, thereby increasing heat sink capacity of the single sided disk over heat sink capacity of the friction disks having the friction material on both side surfaces (double sided disk). Therefore, heat capacity of the power transmission device 1 can be further increased by using more than two pistons and single sided disks.

Since heat generated in slip is intensively absorbed at the other side surface on which the friction material is not attached, i.e., a surface through which the core plate 95 is exposed to the heat, the single sided disk may be thermally deformed more easily than the double sided disk. Therefore, in a case that the friction disk having the friction material 94 on only one side surface is used in the power transmission device 1 according to the exemplary embodiments of the present invention, the ratio of the outer radius (RFo) to the inner radius (RFi) of the friction material can be set as follows in order to improve durability of the friction material 94 and the power transmission device 1.

$$1.50 < k = RF_o/RF_i < 2.00$$

Meanwhile, the scope of the present invention is not limited to the single sided friction disk but includes double sided friction disk.

As described above, the axial force applied onto the disk pack 90, i.e., the piston load increases in the power transmission device 1 having more than two pistons. Therefore, it is very important to evenly distribute the piston load onto the disk pack 90 in order to improve durability of the friction material 94. For this purpose, a contact area with the disk pack 90 is increased by forming more than two pushing portions 78 and 82 that are spaced radially from each other at the second piston 70, or increasing an area of one pushing portion 85 according to various exemplary embodiments of the present invention.

Meanwhile, since the piston load is greatly increased, excessive stress may be generated according to the exemplary embodiments of the present invention. Particularly, if a distance between a center of the pistons, i.e. a center of the area to which the hydraulic pressure is applied and a center of the piston pushing portions, i.e. a reaction force point of the disk pack against the piston load is increased, bending moment generated between the two points is also increased and the pistons may undergo plastic deformation. Therefore, it is required to minimize deformation of the pistons 32 and 70 due to the piston load by limiting the distance between the center of the pistons and the center of the pushing portions within a specific range. According to the exemplary embodiments of the present invention, durability of the pistons 32 and 70 and the power transmission device 1 can be improved by defining a ratio of an average radius (RAm) of the pushing portions to an average radius (RPm) of the pistons as u and limiting a range of u as follows.

$$0.70 < u = RAm/RPm < 2.0$$

Herein, the average radius (RAm) of the pushing portions means an average radius of centers of all the pushing portions 78 and 80, and the average radius (RPm) of the pistons means an average radius of centers of all the pistons 32 and 70. That is, the average radius (RPm) of the pistons is calculated by calculating the average radius of the first piston 32 and the average radius of the second piston 70 from the outer radius and the inner radius of the first piston 32 and the outer radius and the inner radius of the second piston 70 and then calculating an average of the average radii of the first and the second pistons 32 and 70.

If u is less than 0.70 or is greater than 2.0, a distance between a load center point due to operating pressure applied onto the pistons 32 and 70 and a reaction force supporting point, i.e. a pressing point by the disk pack 90 and 92 is increased, thereby generating excessive bending moment to the pistons 32 and 70. Resultantly, stress generated at the pistons may be above elastic limit of piston material (e.g., about 3500 kgf/cm² in a case of S45C). Therefore, if u is set within the above mentioned range in the power transmission device 1, stress generated due to bending moment can be limited below elastic limit of the pistons when operating the pistons, thereby improving durability of the power transmission device 1.

Similarly, the piston load, i.e. the axial force is greatly increased according to the exemplary embodiments of the present invention, it is required to minimize an eccentric load applied to the pistons 32 and 70 and the friction disks 91 and 92 by disposing a center of the pistons 32 and 70 and a center of the friction material 94 as close as possible. If the eccentric load is minimized, durability of the power transmission device 1 can be improved. According to the exemplary embodiments of the present invention, durability of the friction material and the power transmission device can be improved by defining a ratio of an average radius (RFm) of the friction material to the average radius (RPm) of the pistons as v and limiting a range of v as follows.

$$0.80 < v = RFm/RPm < 1.25$$

Herein, the average radius (RFm) of the friction material means an average of an inner radius (RFo) of the friction material and an outer radius (RFi) of the friction material.

If v is less than 0.80 or is greater than 1.25, a distance between the load center point due to operating pressure applied onto the pistons 32 and 70 and a center of the disk pack 90 is increased, thereby generating excessive bending moment to the pistons 32 and 70. Resultantly, stress generated at the pistons 32 and 70 due to the excessive bending moment may exceed elastic limit of the piston material (e.g., about 3500 kgf/cm² in a case of S45C).

In addition, if v is less than 0.80 or is greater than 1.25, excessive eccentric load may be exerted on the disk pack 90 and local stress may be generated at the disk pack 90. Therefore, a bearing pressure of the friction material may exceed an allowable limit (e.g., 70 kgf/cm² in a case of friction material of paper material). Therefore, if v is set to be greater than 0.8 and less than 1.25, durability of the power transmission device 1 can be improved.

Since the piston load is greatly increased according to the exemplary embodiments of the present invention, it is required to evenly distribute the pressure on the disk pack 90. Therefore, the local pressure applied onto the friction disks 91 and 92 should be minimized by disposing the center of the piston pushing portions 78 and 80 and the center of the disk pack 90 as close as possible. According to the exemplary embodiments of the present invention, durability of the friction material 94 and the power transmission device 1 can be improved by defining a ratio of the average radius (RFm) of the friction material to the average radius (RAm) of the pushing portions as z and limiting a range of z as follows.

$$0.80<z=RFm/RAm<1.20$$

If z is less than 0.80 or is greater than 1.20, the local pressure applied onto the disk pack 90 may exceed the allowable limit of the friction material (e.g., 70 kgf/cm$^2$ in a case of friction material of paper material). In this case, the friction material may be worn out at an early stage and characteristics of the friction material may be changed due to heat. Therefore, since the above mentioned range of z limits the local pressure applied to the disk pack 90 below a specific limit, durability of the power transmission device 1 may be improved.

FIG. 5 to FIG. 10 are cross-sectional views of power transmission devices according to various exemplary embodiments of the present invention.

The aforementioned ranges of the spring load, k, u, v, and z may be applied to the power transmission device shown in FIG. 5 to FIG. 10. Further, since the power transmission device shown in FIG. 5 to FIG. 10 is substantially the same as that of the power transmission device shown in FIG. 1 and FIG. 2, the differences therebetween will be mainly described.

FIG. 5 is a cross-sectional view illustrating a power transmission device in accordance with a second exemplary embodiment of the present invention.

The power transmission device 1 in accordance with the second exemplary embodiment of the present invention has different structures in the piston module 30 as compared with the first exemplary embodiment of the present invention. Particularly, the second piston body 74 extends radially in generally linear form, and the second piston exterior circumferential portion 76 extends from the radial outer end of the second piston body 74 toward the one side in the axial direction. The retainer wall 44 also extends long radially according to a shape change of the second piston body 74. Therefore, an area to which the hydraulic pressure of the second piston 70 is applied increases such that the axial force by the second piston 70 increases, resultantly increasing torque capacity of the power transmission device 1.

Further, one pushing portion 85 is widely formed at the other surface of the second piston body 74 facing the first friction disk 91. An additional friction material 84 is attached on the pushing portion 85. Effect of adding one additional friction disk to the power transmission device 1 may be obtained by attaching the additional friction material 84 on the second piston 70, and accordingly, torque capacity of the power transmission device 1 can be further increased.

Since the additional friction material 84 is attached on the second piston 70, the additional friction material 84 and the first friction disk 91 may rotate relatively due to friction therebetween when operating or releasing the power transmission device 1. Therefore, the piston module 30 and the housing may rotate relatively. To prevent this, a first rotation stopper 54 is formed to be protruded in the axial direction from one end of the retainer body 42, and a first stopper recess 20 is formed at a position of the clutch connecting portion 12 corresponding to the first rotation stopper 54.

Further, a second rotation stopper 86 is formed to be protruded in the axial direction from one surface of the second piston body 74, and a second stopper recess 52 is formed at a position of the retainer wall 44 corresponding to the second rotation stopper 86. Therefore, relative rotation of the piston module 30 and the clutch housing 14 can be prevented when operating or releasing the power transmission device 1.

According to the second exemplary embodiment of the present invention, the area to which the hydraulic pressure of the second piston 70 is applied may be increased and torque capacity and thermal capacity of the power transmission device 1 may be further increased by attaching the additional friction material 84 on the second piston 70.

FIG. 6 is a cross-sectional view of a power transmission device according to a third exemplary embodiment of the present invention.

The power transmission device according to the third exemplary embodiment of the present invention has different structures in the piston module 30 as compared with the first exemplary embodiment of the present invention. Particularly, the second piston body 74 extends radially in generally linear form, and the second piston exterior circumferential portion 76 extends from the radial outer end of the second piston body 74 toward the one side in the axial direction. The retainer wall 44 also extends long radially according to a shape change of the second piston body 74. Further, one pushing portion 85 is widely formed at the other surface of the second piston body 74 facing the first friction disk 91. The sealing member which was disposed between the exterior circumference of the second piston exterior circumferential portion 76 and the interior circumference of the clutch housing 14 is removed, and a plurality of oil recesses 88 are formed on the exterior circumference of the second piston exterior circumferential portion 76 in the power transmission device according to the third exemplary embodiment of the present invention. The operation oil in the first piston chamber 38 is prevented from being leaked by precisely machining the exterior circumference of the second piston exterior circumferential portion 76 and the interior circumference of the clutch housing 14, and friction between the first piston 32 and the housing can be reduced by filling the operation oil in the oil recesses 88 and causing the operation oil to function as lubrication and sealing.

According to the third exemplary embodiment of the present invention, cost may be curtailed and friction of the piston module 30 may be reduced by removing some sealing members.

FIG. 7 is a cross-sectional view of a power transmission device according to a fourth exemplary embodiment of the present invention.

The power transmission device according to the fourth exemplary embodiment of the present invention, as compared with the first exemplary embodiment of the present invention, further includes separating springs 64 between neighboring first friction disks 91 or between the supporting plate 106 and the first friction disk 91 adjacent to the supporting plate 106. The separating spring 64 is disposed at a radial outer position of the second friction disk 92. If the separating springs 64 are disposed between the neighboring first friction disks 91 or between the supporting plate 106 and the first friction disk 91 adjacent to the supporting plate 106, a space between the first and the second friction disks 91 and 92 is maintained and drag torque generated when the power transmission device 1 is released can be reduced. Therefore, efficiency of the power transmission device 1 may be improved.

Further, the return spring 60 can be omitted from the piston module 30 by increasing load of the separating spring 64 and causing the separating spring 64 to function as the return spring. In this case, load of each separating spring 64 should be substantially the same as that of the return spring. That is, even though a plurality of separating spring 64 are used, the piston module 30 can be returned to the installation position by only one separating spring 64. For this purpose, the load of each separating spring 64 is preferably set to be within a load range defined by [Formula 11] or [Formula 12]. In this case, it is to be understood that the load of the return spring is not a sum of loads of all the separating springs but is the load of each separating spring.

The separating spring 64 may be any type of spring that can provide elastic force, such as a disk spring, a wave spring, a coil spring, a rubber spring, etc.

FIG. 8 is a cross-sectional view of a power transmission device according to a fifth exemplary embodiment of the present invention.

The power transmission device according to the fifth exemplary embodiment of the present invention, as compared with the first exemplary embodiment of the present invention, further includes the separating springs 64 between neighboring second friction disks 92 or between the second piston 70 and the second friction disk 92 adjacent to the second piston 70. The separating spring 64 is disposed at a radial inner position of the first friction disk 91. Since the second piston 70 and the second friction disk 92 can rotate relatively to each other, a sliding bearing 89 is provided between the second piston 70 and the separating spring 64. Therefore, the second piston 70 and the second friction disk 92 can rotate relatively with each other. In addition, a spring supporting member 107 is mounted at a position of the power transmission hub 96 corresponding to the supporting plate 106 so as to support the separating spring 64. The spring supporting member 107 supports the separating spring 64 and functions as a dam ring. In similar to the fourth exemplary embodiment, if the separating springs 64 are disposed between the neighboring second friction disks 92 or between the second piston 70 and the second friction disk 92 adjacent to the second piston 70, a space between the first and the friction disks 90 and 92 is maintained and drag torque generated when the power transmission device 1 is released can be reduced. In addition, the return spring 60 can be removed from the piston module 30.

In similar to the fourth exemplary embodiment, the return spring 60 can be removed from the power transmission device 1 by increasing the load of the separating spring 64 and causing the separating spring 64 to function as the return spring. In this case, the load of each separating spring 64 should be substantially the same as that of the return spring. That is, even though a plurality of separating spring 64 are used, the piston module 30 can be returned to the installation position by only one separating spring 64. For this purpose, the load of each separating spring 64 is preferably set to be within a load range defined by [Formula 11] or [Formula 12]. In this case, it is to be understood that the load of the return spring is not a sum of loads of all the separating springs but is the load of each separating spring.

Meanwhile, shapes of components included in the piston module 30 are changed according to the fifth exemplary embodiment, but functions of the components according to the fifth exemplary embodiment are the same as those according to the first exemplary embodiment. Therefore, detailed description of the components will be omitted.

FIG. 9 to FIG. 10 are cross-sectional views showing that power transmission devices according to exemplary embodiments of the present invention are applied to a tractor. However, the exemplary embodiments of the present invention are not limited to those illustrated in FIG. 9 to FIG. 10.

In a tractor, two power transmission devices 1 are disposed to face each other on one input shaft 10. Since the two power transmission devices 1 are arranged to share the clutch connecting portion 12, it is required to manufacture the housing easily.

A first radially extended portion 12a and a second radially extended portion 12b of the clutch connecting portion 12 are separately manufactured according to a sixth exemplary embodiment illustrated in FIG. 9. That is, the clutch housing 14, the first radially extended portion 12a, and the disk housing 15 are integrally formed with each other through a method such as flow forming, machining, etc. Further, the second radially extended portion 12b is formed on the input shaft 10. After that, the first radially extended portion 12a and the second radially extended portion 12b are coupled to each other through coupling means such as welding, press-fit, or serration so as to provide two mounting spaces.

In addition, the input shaft 10 is used as the clutch hub according to the sixth exemplary embodiment. That is, the clutch hub is not additionally manufactured. A first supply hole 150 for supplying the operating hydraulic pressure to one power transmission device 1 is formed in the input shaft 10, and the first supply hole 150 is fluidly communicated with the operating hydraulic pressure supply line 16 of the one power transmission device 1. In addition, a second supply hole 152 for supplying the operation oil to the other power transmission device 1 is formed in the input shaft 10, and the second supply hole 152 is fluidly communicated with the operating hydraulic pressure supply line 16 of the other power transmission device 1. Furthermore, a third supply hole 154 for supplying cooling oil and balance oil to both of the two power transmission devices 1 is formed in the input shaft 10, and the third supply hole 154 is fluidly communicated with the cooling oil supply lines 18 and the first balance hydraulic pressure supply lines 19 of the two power transmission devices 1. According to the sixth exemplary embodiment, since the clutch housing 14, the disk housing 15 and the first radially extended portion 12a are integrally formed with each other, and the second radially extended portion 12b and the clutch hub are mounted on the input shaft 10, production cost may be curtailed.

The clutch housing 14 and the disk housing 15 can be separately manufactured according to a seventh exemplary embodiment illustrated in FIG. 10. That is, the clutch hub 10, the clutch connecting portion 12, and the clutch housing 14 are integrally formed with each other through a method such as machining, etc. Further, two disk housings 15 of cylindrical shape are separately manufactured through a method such as press forming, etc. After that, the two disk housings 15 are coupled to both ends of the clutch housing 14 in the axial direction through coupling means such as welding, press-fit, or caulking. According to the seventh exemplary embodiment, the input shaft is configured to be inserted into an interior circumference of the clutch hub 10, and the first, the second, and the third supply holes 150, 152, and 154 may be formed in the input shaft (please see FIG. 9). According to the seventh exemplary embodiment, since the clutch housing 14 and the disk housing 15 are separately manufacture, various manufacturing methods can be used and resultantly, production cost may be curtailed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A power transmission device comprising:
    a housing arranged to form a mounting space by connecting a clutch housing, a clutch connecting portion, a clutch hub and a disk housing to each other;
    a power transmission hub selectively and operably connected to the housing;
    a plurality of first friction disks splined to an interior circumference of the disk housing;
    a plurality of second friction disks splined to an exterior circumference of the power transmission hub and disposed alternately with the first friction disks;
    a piston module including two or more pistons, each of which has a corresponding piston chamber, and selectively and frictionally coupling the first friction disks with the second friction disks by an operating hydraulic pressure supplied to the piston chambers; and
    at least one return spring or at least one separating spring supplying a spring load counteracting against an axial force generated by the operating hydraulic pressure, and disposed at an inside or an outside of the piston module,
    wherein the spring load $F_s$ (kgf) of the at least one return spring or the at least one separating spring acting on the piston module is within a range of $$0.45 \text{ bar} \leq \frac{F_s}{A} \leq P - 1.2 \frac{A^c}{A} \times (P - 1 \text{ bar}),$$

where "A" (cm$^2$) indicates a total piston area of the two or more pistons, "P" (kgf/cm$^2$) indicates the operating hydraulic pressure, "A$^c$" (cm$^2$) indicates a pressure chamber area formed by the housing, and 1 bar is 1.019716 kgf/cm$^2$.

2. The power transmission device of claim 1, wherein the spring load $F_s$ of the at least one return spring or the at least one separating spring acting on the piston module is within a range of $$0.5 \leq \frac{F_s}{A} \leq 1.8.$$

3. The power transmission device of claim 1, wherein the two or more pistons are arranged to be movable together with each other in an axial direction such that axial forces of the more than two pistons by the operating hydraulic pressure are added.

4. The power transmission device of claim 3, wherein the piston module comprises:
    a retainer disposed on the clutch hub, a movement of the retainer in the axial direction being limited;
    a first piston including a first piston interior circumferential portion and a first piston exterior circumferential portion and forming a first piston chamber between the first piston and the housing, the first piston interior circumferential portion being movable on the retainer in the axial direction; and
    a second piston including a second piston interior circumferential portion and a second piston exterior circumferential portion and forming a second piston chamber between the second piston and the retainer, wherein the second piston interior circumferential portion is separated from the first piston interior circumferential portion in the axial direction by the retainer and is movable on the retainer in the axial direction, and the second piston exterior circumferential portion contacts with the first piston exterior circumferential portion, and
    wherein the at least one return spring is disposed between the first piston and the retainer, between the second piston and the retainer, or at the outside of the piston module to apply the spring load to the first piston or the second piston.

5. The power transmission device of claim 4, wherein the retainer, the first piston and the second piston forms a balance chamber, and the retainer is arranged to supply a balance hydraulic pressure to the balance chamber.

6. The power transmission device of claim 1, wherein the disk housing is provided with a supporting plate for supporting the first friction disks and the second friction disks in the axial direction, and
    wherein the at least one separating spring is disposed between neighboring first friction disks or between the supporting plate and the first friction disk adjacent to the supporting plate at a radial outer position of the second friction disks.

7. The power transmission device of claim 1, wherein the disk housing is provided with a supporting plate for supporting the first friction disks and the second friction disks in the axial direction, and
    wherein the at least one separating spring is disposed between neighboring second friction disks or between the supporting plate and the second friction disk adjacent to the supporting plate at a radial inner position of the first friction disks.

8. The power transmission device of claim 7, wherein the at least one separating spring is disposed between the piston module and the second friction disk adjacent to the piston module at the radial inner position of the first friction disks, and the piston module includes a sliding bearing for rotatably supporting the separating spring.

9. A power transmission device comprising:
    a housing arranged to form a mounting space by connecting a clutch housing, a clutch connecting portion, a clutch hub and a disk housing to each other;
    a power transmission hub selectively and operably connected to the housing;
    a plurality of first friction disks splined to an interior circumference of the disk housing;
    a plurality of second friction disks splined to an exterior circumference of the power transmission hub and disposed alternately with the first friction disks;
    a piston module including two or more pistons, each of which has a corresponding piston chamber, and selectively and frictionally coupling the first friction disks with the second friction disks by an operating hydraulic pressure supplied to the piston chambers; and
    at least one return spring or at least one separating spring supplying a spring load counteracting against an axial force generated by the operating hydraulic pressure, and disposed at an inside or an outside of the piston module,
    wherein at least one pushing portion for directly applying the axial force onto the first friction disk or the second friction disk is formed at at least one of the two or more pistons included in the piston module, wherein a ratio (u) of an average radius (RAm) of the at least one pushing portion to an average radius (RPm) of the two or more pistons is within a range of 0.70<u<2.0, and wherein the piston module comprises:

a retainer disposed on the clutch hub, a movement of the retainer in the axial direction being limited;

a first piston including a first piston interior circumferential portion and a first piston exterior circumferential portion and forming a first piston chamber between the first piston and the housing, the first piston interior circumferential portion being movable on the retainer in the axial direction; and a second piston including a second piston interior circumferential portion and a second piston exterior circumferential portion and forming a second piston chamber between the second piston and the retainer, wherein the second piston interior circumferential portion is separated from the first piston interior circumferential portion in the axial direction by the retainer and is movable on the retainer in the axial direction, and the second piston exterior circumferential portion contacts with the first piston exterior circumferential portion, and wherein the at least one return spring is disposed between the first piston and the retainer, between the second piston and the retainer, or at the outside of the piston module to apply the spring load to the first piston or the second piston.

10. The power transmission device of claim 9, wherein friction material is attached to any one surface or both surfaces of each first friction disk or each second friction disk, and wherein a ratio (v) of an average radius (RFm) of the friction material to the average radius (RPm) of the two or more pistons is within a range of 0.80<v<1.25.

11. The power transmission device of claim 9, wherein friction material is attached to any one surface or both surfaces of each first friction disk or each second friction disk, and wherein a ratio (z) of an average radius (RFm) of the friction material to the average radius (RAm) of the at least one pushing portion is within a range of 0.80<z<1.20.

12. The power transmission device of claim 9, wherein the retainer, the first piston and the second piston forms a balance chamber, and the retainer is arranged to supply a balance hydraulic pressure to the balance chamber.

13. The power transmission device of claim 9, wherein an additional friction material is attached to a surface of the second piston facing the first friction disks or the second friction disks, and the second piston is arranged to push the first friction disks or the second friction disks through the additional friction material.

14. The power transmission device of claim 13, wherein a stopper recess is formed at one of the second piston and the retainer facing each other and a rotation stopper that is insertable into the stopper recess is formed at the other of the second piston and the retainer facing each other, or the stopper recess is formed at one of the retainer and the clutch housing facing each other and the rotation stopper that is insertable into the stopper recess is formed at the other of the retainer and the clutch housing facing each other.

15. The power transmission device of claim 9, wherein the disk housing is provided with a supporting plate for supporting the first friction disks and the second friction disks in the axial direction, and wherein the at least one separating spring is disposed between neighboring first friction disks or between the supporting plate and the first friction disk adjacent to the supporting plate at a radial outer position of the second friction disks.

16. The power transmission device of claim 9, wherein the disk housing is provided with a supporting plate for supporting the first friction disks and the second friction disks in the axial direction, and wherein the at least one separating spring is disposed between neighboring second friction disks or between the supporting plate and the second friction disk adjacent to the supporting plate at a radial inner position of the first friction disks.

17. The power transmission device of claim 16, wherein the at least one separating spring is disposed between the piston module and the second friction disk adjacent to the piston module at the radial inner position of the first friction disks, and the piston module is provided with a sliding bearing for rotatably supporting the separating spring.

18. The power transmission device of claim 9, wherein friction material is attached to any one surface or both surfaces of each first friction disk or each second friction disk, and wherein a ratio (k) of an outer radius (RFo) of the friction material to an inner radius (RFi) of the friction material is within a range of 1.30<k<2.20.

19. The power transmission device of claim 9, wherein friction material is attached to any one surface of each first friction disk and each second friction disk, and wherein a ratio (k) of an outer radius (RFo) of the friction material to an inner radius (RFi) of the friction material is within a range of 1.50<k<2.00.

* * * * *